R. S. TORREY.
Bee Hive.
No. 24,342.
Patented June 7, 1859.
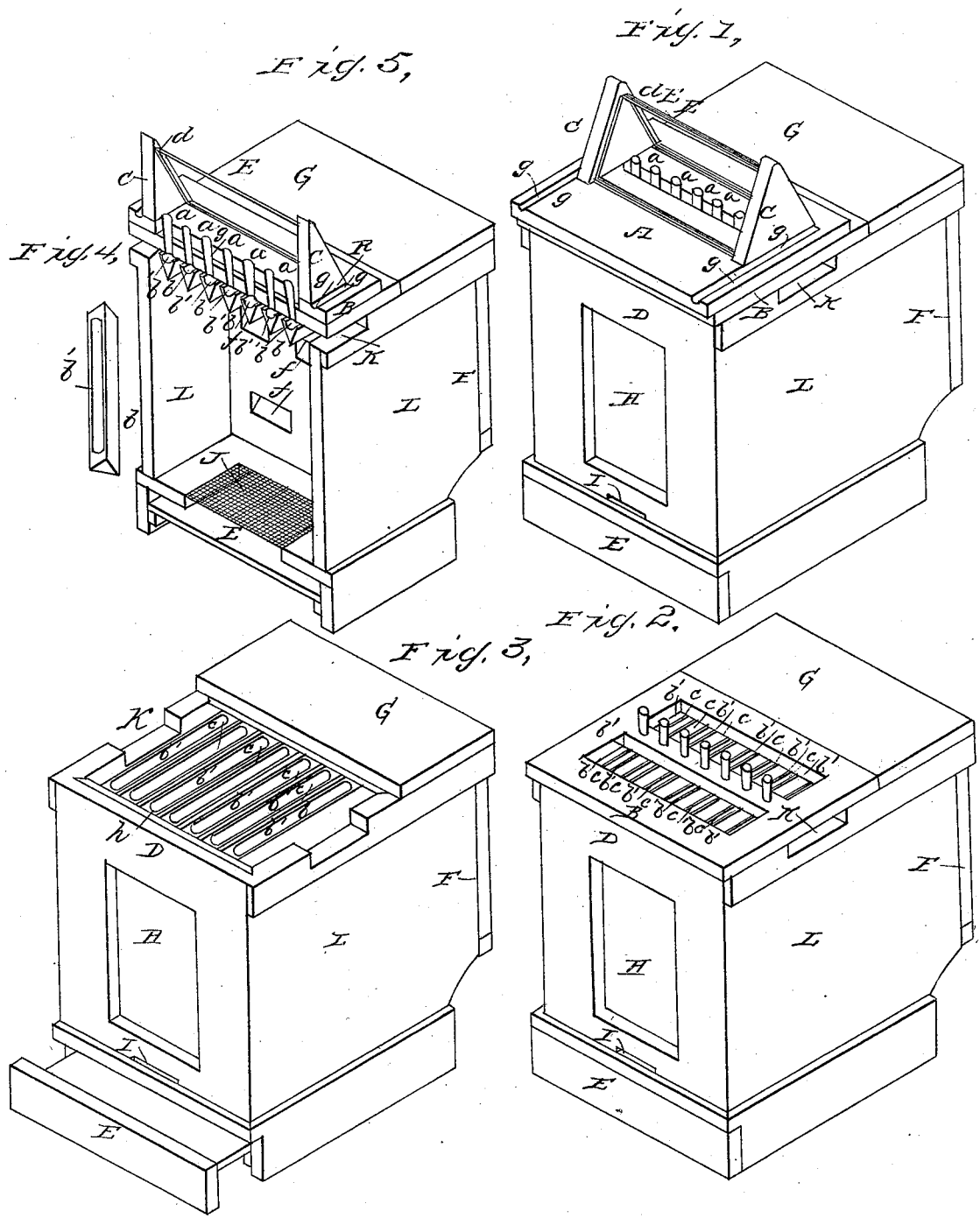
WITNESSES:
INVENTOR
R. S. Torrey

UNITED STATES PATENT OFFICE.

RUGGLES S. TORREY, OF BANGOR, MAINE.

BEEHIVE.

Specification of Letters Patent No. 24,342, dated June 7, 1859.

*To all whom it may concern:*

Be it known that I, RUGGLES S. TORREY, of Bangor, in the county of Penobscot and State of Maine, have invented a new Improvement in Beehives; and I do declare that the following is a full and exact description thereof, reference being had to the accompanying drawings and to the letters of reference marked thereon.

The nature of my invention consists in so constructing the bee hives that the bees may be fed at the top of the hives and a perfect ventilation, at the same time through the same openings, be obtained for the natural heat and moisture which the bees generate, and condensing that moisture outside and on top of the bee hives, without obstructing the free passage of the bees through the comb-bars.

To enable those skilled in the art to make and use my invention I will proceed to describe its construction and operation.

I construct my hive in the usual form as represented by Figure 1. A represents a movable cover upon which is permanently fixed a triangular glass or metal condenser fitting over the tubes leading into the grooved strips or feeding troughs. (*a*) represents the tubes. B is a movable cover in which is placed the stationary tubes; and in which are two pieces of glass showing the condition of the grooves or feeding troughs, whether empty or otherwise. E is a sliding bottom for whatever filth or excrement falls from the hive. F is a door at the back of the hive, to the rear, where the honey boxes are deposited. H is a glass opening, in front, to view the working of the bees in the principal hive. I is a small passage-way for the egress and the ingress of the bees. K is a passage to connect with other hives. C is a glass or metal condenser, with two sides glass or metal, fitting over and shutting down upon the tubes, preventing too free a current of air in the hive, and condensing the vapor and breath of the bees, forming ice and frost on the condenser, instead of the inside of the hive, where it melts more readily and runs into gutters (*g g*) around the top of the hive and is carried off. (*d*) and (*e e*) represent the top edges of the glasses of the condenser.

Fig. 2 represents the hive with the upper cover and condenser off, disclosing the grooved strips (*b′ b′*) and the tubes (*a a*) through the glass, (*c c*) being the spaces between.

Fig. 3 represents the hive with both movable covers off and disclosing the grooved strips or feeding troughs more clearly. (*h h*) are strips which hold the bars in place.

Fig. 4 represents the movable suspension bars (*b*)—a longitudinal view. By means of these movable bars any one of the combs can be separately taken out for any purpose. (*b*) is the groove or trough.

Fig. 5 is a section of the principal hive showing the interior, and representing the hive divided in the center of the condenser. (*f*) is an outlet from the principal hive to the apartment where the honey boxes are. (*b*) is the strip; (*b′*), the groove or trough; (*c*), the space between. J is a wire gauze at the bottom of the hive for ventilation.

The bees are to be fed from the top of the hive over the combs which are attached to a series of movable strips shaped like an acute angle triangle, having the two short sides equal and the upper surface grooved into troughs, into which the feed is conducted through tubes or holes leading into the trough. The tubes are to set closely into the troughs, having slits of from one-half to three-quarters of an inch at the bottom for the feed to escape into the troughs, but not large enough to allow the bees to enter the tube and make their escape—the bars to be an inch and a quarter wide and five sixteenths of an inch apart, and so far from the cover of the hive as to allow the bees to pass and repass to and from the feeding troughs—the slits and the tubes together with the vacant space between the bars and the cover serving to preserve the ventilation.

I am aware that feeding tubes and troughs have been employed, arranged and used heretofore at the top of the hive, but such arrangements, as heretofore employed, necessarily obstruct the free passage between the comb-bars. I do not therefore claim these devices, as such, but What I do claim and desire to secure by Letters Patent is—

Providing the troughs in the tops of the comb-bars arranged with the series of conducting tubes for conveying the feed to the troughs, and with apertures or slits for the free exit of the moisture to the condenser in the manner and for the purpose described.

RUGGLES S. TORREY.

Witnesses:
FREDR. E. SHAW,
S. W. MERRILL.